United States Patent
Hirose et al.

(10) Patent No.: US 9,900,546 B2
(45) Date of Patent: Feb. 20, 2018

(54) MONITORING SYSTEM AND MONITORING CAMERA

(71) Applicant: Mitsubishi Electric Corporation, Chiyoda-ku (JP)

(72) Inventors: Tomotaka Hirose, Chiyoda-ku (JP); Yuki Nakada, Chiyoda-ku (JP); Hideo Kawamura, Chiyoda-ku (JP); Makoto Yamashita, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 280 days.

(21) Appl. No.: 14/760,518

(22) PCT Filed: Nov. 22, 2013

(86) PCT No.: PCT/JP2013/081539
§ 371 (c)(1),
(2) Date: Jul. 13, 2015

(87) PCT Pub. No.: WO2014/112207
PCT Pub. Date: Jul. 24, 2014

(65) Prior Publication Data
US 2015/0358576 A1    Dec. 10, 2015

(30) Foreign Application Priority Data
Jan. 15, 2013    (JP) ................. 2013-004615

(51) Int. Cl.
*H04N 7/18*    (2006.01)
*H04N 5/77*    (2006.01)
(Continued)

(52) U.S. Cl.
CPC ......... *H04N 5/772* (2013.01); *G06K 9/00771* (2013.01); *G11B 27/36* (2013.01);
(Continued)

(58) Field of Classification Search
CPC ................................. H04N 5/2252
(Continued)

(56) References Cited

U.S. PATENT DOCUMENTS

2003/0202099 A1    10/2003    Nakamura et al.
2004/0105450 A1    6/2004    Ikuta et al.
(Continued)

FOREIGN PATENT DOCUMENTS

| JP | 1-191298 A | 8/1989 |
| JP | 8-137629 A | 5/1996 |

(Continued)

OTHER PUBLICATIONS

Office Action dated Mar. 7, 2017 in Japanese Patent Application No. 2016-093762 (with unedited computer generated English translation).
(Continued)

*Primary Examiner* — Andy Rao
(74) *Attorney, Agent, or Firm* — Oblon, McClelland, Maier & Neustadt, L.L.P.

(57) ABSTRACT

A monitoring system has a monitor connected to a monitoring camera and a monitoring recorder via a network. The monitor checks whether the monitoring recorder is in a recordable state or in an unrecordable state of monitoring video data, and if the monitor confirms an unrecordable state of the monitoring recorder, the monitor 3 transmits a control signal for instructing the monitoring camera to start video recording. Receiving the control signal instructing to start the video recording, the monitoring camera records the monitoring video data it takes in its own storage medium.

16 Claims, 10 Drawing Sheets

(51) Int. Cl.
*G06K 9/00* (2006.01)
*G11B 31/00* (2006.01)
*G11B 27/36* (2006.01)
*H04N 5/765* (2006.01)

(52) U.S. Cl.
CPC ........... *G11B 31/006* (2013.01); *H04N 5/765* (2013.01); *H04N 7/181* (2013.01); *H04N 7/188* (2013.01)

(58) Field of Classification Search
USPC .................................................. 348/142–160
See application file for complete search history.

(56) References Cited

U.S. PATENT DOCUMENTS

2005/0044258 A1  2/2005  Nakamura
2009/0265462 A1  10/2009  Tajiri
2012/0300081 A1*  11/2012  Kim ................. G08B 13/19656
                                                               348/159

FOREIGN PATENT DOCUMENTS

| | | |
|---|---|---|
| JP | 2003-319375 A | 11/2003 |
| JP | 2004-172780 A | 6/2004 |
| JP | 2005-26866 A | 1/2005 |
| JP | 2006-325036 A | 11/2006 |
| JP | 2007-36369 A | 2/2007 |
| JP | 2007-166181 A | 6/2007 |
| JP | 2008-117151 A | 5/2008 |
| JP | 2009-21645 A | 1/2009 |
| JP | 2009-44386 A | 2/2009 |
| JP | 2009-260838 A | 11/2009 |
| JP | 2010-93665 A | 4/2010 |
| JP | 2010-226182 A | 10/2010 |
| JP | 2011-76657 A | 4/2011 |
| JP | 2011-209799 A | 10/2011 |
| JP | 2011-248935 A | 12/2011 |
| JP | 2012-49724 A | 3/2012 |
| JP | 2012-90235 A | 5/2012 |

OTHER PUBLICATIONS

International Search Report dated Feb. 18, 2014, in PCT/JP2013/081539, filed Nov. 22, 2013.

Office Action dated Feb. 16, 2016 in Japanese Patent Application No. 2014-557345 with partial English translation.

* cited by examiner

MONITORING SYSTEM AND MONITORING CAMERA

TECHNICAL FIELD

The present invention relates to a monitoring system and a monitoring camera, which convert an image taken with a camera to video data, distribute it via a network, and record it as monitoring video for the purpose of remote monitoring.

BACKGROUND ART

In a monitoring system that records monitoring video, a RAID (Redundant Array of Independent Disks) is provided against a fault of a recorder such as an HDD. As disclosed in a Patent Document 1, for example, a RAID is configured in such a manner as to enable recovering data even if one of a plurality of HDDs has a failure.

In addition, a Patent Document 2 discloses an example which has at least two units of RAID to record the same video data.

The configuration as disclosed in the Patent Document 1, however, cannot continue recording if a component other than the HDDs, such as a power supply has a failure. In addition, the configuration as shown in the Patent Document 2 has low utilization efficiency of record capacity because it records the same data in a plurality of recording destinations. Thus, a Patent Document 3, for example, configures a monitoring system using a plurality of monitoring video recorders, and records the video data separately in the monitoring video recorders, thereby trying to solve the problems.

PRIOR ART DOCUMENT

Patent Document

Patent Document 1: Japanese Patent Laid-Open No. 8-137629/1996.
Patent Document 2: Japanese Patent Laid-Open No. 2008-117151.
Patent Document 3: Japanese Patent Laid-Open No. 2011-248935.

DISCLOSURE OF THE INVENTION

Problems to be Solved by the Invention

The configuration such as that disclosed in the Patent Document 3, however, has to construct a monitoring system using a plurality of monitoring video recorders, and to continue recording the monitoring video by the plurality of monitoring video recorders even in a normal operation state without any failure. Accordingly, it has a problem of low utilization efficiency of the record capacity. In addition, as a factor of stopping the monitoring video recording, it takes up only a device failure, thereby offering a problem of not considering an active case such as maintenance of the monitoring video recorder.

The present invention is implemented to solve the foregoing problems. Therefore it is an object of the present invention to provide a monitoring system and a monitoring camera capable of securing the completeness of the monitoring video recording while maintaining high utilization efficiency of the record capacity.

Means for Solving the Problems

To accomplish the object, a monitoring system in accordance with the present invention comprises a monitoring camera that can distribute monitoring video data via a network and possesses its own storage medium and is able to record the monitoring video, and a monitoring recorder that receives and records the monitoring video data the monitoring camera distributes via the network, wherein the monitoring recorder comprises a device state monitor that detects a start and stop of a device restart of the monitoring recorder itself, and that taking the detection of the start and stop of the device restart as motivation, instructs the monitoring camera to start and stop the video recording via the network, and wherein the monitoring camera comprises a control signal transmitter-receiver that receives the instruction to start and stop the video recording via the network, and a controller that controls the start and stop of the video recording to the storage medium the monitoring camera possesses as its own in response to the instruction to start and stop the video recording.

Advantages of the Invention

According to the present invention, it can secure the completeness of the monitoring video recording while maintaining the high utilization efficiency of the record capacity.

BEST MODE FOR CARRYING OUT THE INVENTION

The best mode for carrying out the invention will now be described with reference to the accompanying drawings.

Embodiment 1

Figure 1:
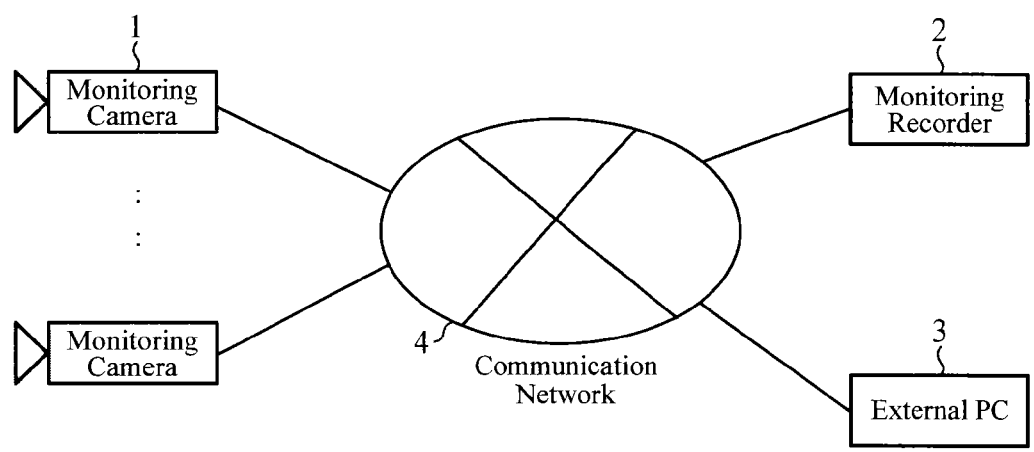
FIG. 1 is a diagram showing an overall configuration of a monitoring system of an embodiment 1 in accordance with the present invention.

FIG. 1 is a diagram showing an overall configuration of a monitoring system of an embodiment 1 in accordance with the present invention.

The monitoring system has a monitoring camera 1, a monitoring recorder 2 and an external PC 3 connected to each other via a communication network 4 such as an IP network for transmitting monitoring video data.

The monitoring camera 1 takes an image and encodes it, and distributes monitoring video data via the network (communication network 4).

The monitoring recorder 2 is a monitoring video recorder that receives and records the video data the monitoring camera 1 distributes.

The external PC 3 has a function of browsing the video data distributed from the monitoring camera 1 or monitoring recorder 2.

Figure 2:
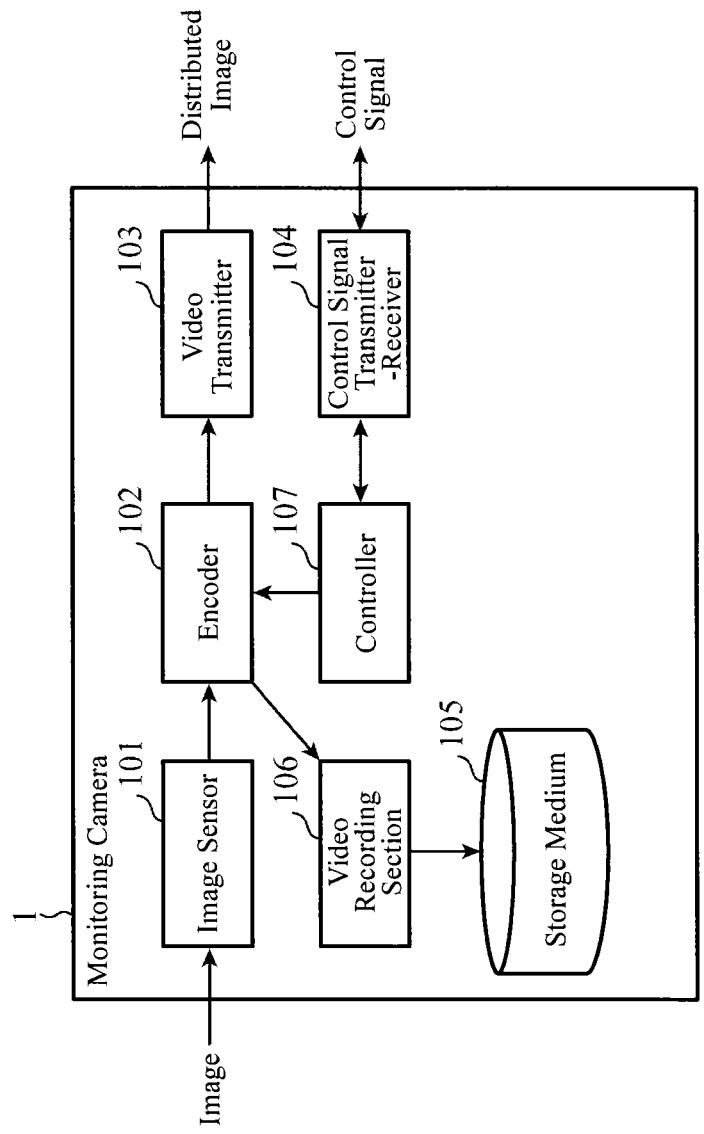
FIG. 2 is a block diagram of a monitoring camera connected to the monitoring system of the embodiment 1 in accordance with the present invention.

FIG. 2 is a block diagram of the monitoring camera 1 to be connected to the monitoring system of the embodiment 1 in accordance with the present invention.

The monitoring camera 1 comprises an image sensor 101, an encoder 102, a video transmitter 103, a control signal transmitter-receiver 104, a storage medium 105, a video recording section 106, and a controller 107.

The image sensor 101 takes an image as an optical signal and converts to a digital signal.

The encoder 102 encodes the digital video signal output from the image sensor 101 using an encoding method such as JPEG, MPEG or H.264.

The video transmitter 103 distributes the video data passing through the encoding of the encoder 102 to the network.

The control signal transmitter-receiver 104 receives a control signal to the monitoring camera 1.

The storage medium 105 is a storage medium such as a memory card for storing data.

The video recording section 106 records the video data passing through the encoding of the encoder 102 in the storage medium 105.

The controller 107, according to the control signal the control signal transmitter-receiver 104 receives, controls whether to distribute the video data encoded by the encoder 102 through the video transmitter 103 or to record the video data in the storage medium 105 the monitoring camera itself possesses using the video recording section 106.

Figure 3:
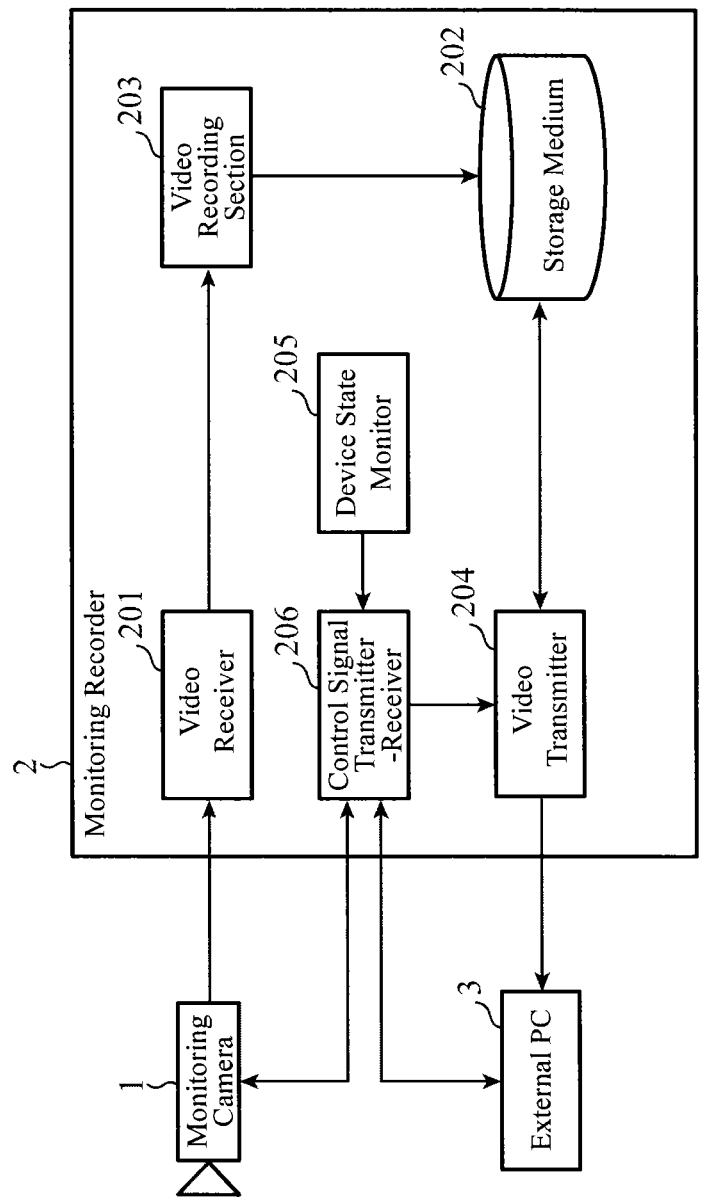
FIG. 3 is a block diagram of a monitoring recorder connected to the monitoring system of the embodiment 1 in accordance with the present invention.

FIG. 3 is a block diagram of the monitoring recorder 2 connected to the monitoring system of the embodiment 1 in accordance with the present invention.

The monitoring recorder 2 comprises a video receiver 201, a storage medium 202, a video recording section 203, a video transmitter 204, a device state monitor 205, and a control signal transmitter-receiver 206.

The video receiver 201 receives via the communication network 4 the monitoring video data the monitoring camera 1 distributes.

The storage medium 202 is a storage medium such as a hard disk drive or a RAID for storing data.

The video recording section 203 records the video data the video receiver 201 receives in the storage medium 202.

The video transmitter 204 redistributes the recorded video data to the network in response to a request from the external PC 3.

The device state monitor 205 monitors the state of the device (monitoring recorder 2) itself.

The control signal transmitter-receiver 206 exchanges the control signal between it and the monitoring camera 1 or the external PC 3.

First, the operation of the monitoring recorder 2 will be described.

While the monitoring system operates normally, the monitoring camera 1 distributes the video data to the network, and the monitoring recorder 2 stores the received video data in the storage medium 202 by the video recording section 203.

However, when carrying out device maintenance such as replacing the storage medium 202 in the monitoring recorder 2, this usually involves a device restart of the monitoring recorder 2. At the device restart, the device state monitor 205 recognizes the device restart by referring to the device state information an installed OS has, and transmits a video recording start instruction to the monitoring camera 1 via the control signal transmitter-receiver 206.

In addition, as its paired operation, the device state monitor 205 recognizes the end of the device restart by referring to the device state information the installed OS has, and transmits a video recording stop instruction to the monitoring camera 1 via the control signal transmitter-receiver 206.

Incidentally, as for the video recording start instruction and video recording stop instruction to the monitoring camera 1, a configuration is also possible in which the monitoring recorder 2 comprises a UI (User Interface) that recognizes a start and end of the device maintenance according to the operation of a user, and transmits the video recording start instruction and video recording stop instruction to the monitoring camera 1. Generally, since the monitoring camera usually supports a setting command and a state monitoring command, the video recording start instruction and the video recording stop instruction can be installed easily by a method of extending these existing commands.

Besides the device maintenance as described above, there are some cases where the monitoring recorder 2 cannot continue video recording such as an occurrence of an anomaly in the storage medium 202 or an anomaly of a software section controlling the video recording in the monitoring recorder 2.

If such an anomaly occurs, the device state monitor 205 recognizes it as an occurrence of a record anomaly by detecting an error of a return value from a storage medium control API (Application Program Interface) the installed OS of the device or a storage medium control driver offers, or by detecting that there is no response from the software section controlling the video recording, and transmits the video recording start instruction to the monitoring camera 1 via the control signal transmitter-receiver 206.

In addition, as its paired operation, the device state monitor 205 recognizes the recovery from the record anomaly by detecting that the return value from the storage medium control API changes from the error to the normal, or by detecting that the response from the software section controlling the video recording changes from the absence to the presence of the response, and transmits the video recording stop instruction to the monitoring camera 1 via the control signal transmitter-receiver 206.

Next, the operation of the monitoring camera 1 will be described.

Figure 4:
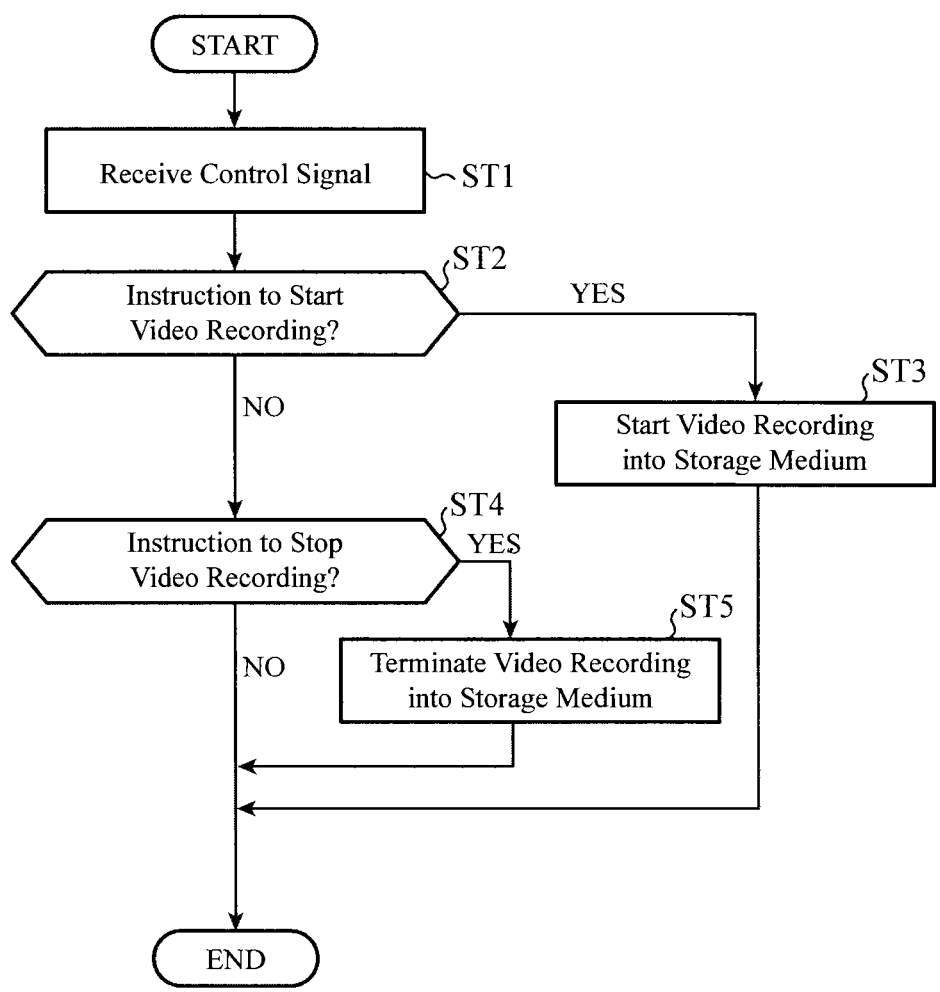
FIG. 4 is a flowchart showing the processing of the monitoring camera of the embodiment 1 in accordance with the present invention.

FIG. 4 is a flowchart showing the processing of the monitoring camera 1 of the embodiment 1 in accordance with the present invention.

The control signal transmitter-receiver 104 of the monitoring camera 1 receives the control signal from the outside via the communication network 4 (step ST1).

Next, the controller 107 receives the control signal the control signal transmitter-receiver 104 receives at step ST1, and decides whether the control signal is the video recording start instruction transmitted from the monitoring recorder 2 or not (step ST2).

If it decides that the control signal is the video recording start instruction ("YES" at step ST2), the video recording section 106 of the monitoring camera 1 starts to record the video data in the storage medium 105 (step ST3). More specifically, the controller 107 instructs the encoder 102 to transmit the encoded video data to the video recording section 106, and controls the video recording section 106 to store it into the storage medium 105. Incidentally, while the video recording section 106 is recording the video data into the storage medium 105, the distribution of the encoded video data to the network by the video transmitter 103 may be or may not be interrupted.

Unless it decides that the control signal is the video recording start instruction ("NO" at step ST2), the controller 107 decides whether the received control signal is the video recording stop instruction or not (step ST4). If it is the video recording stop instruction ("YES" at step ST4), the video recording section 106 terminates recording the video data in the storage medium 105 (step ST5). More specifically, the controller 107 instructs the encoder 102 to end the transmission of the encoded video data to the video recording section 106.

As described above, according to the monitoring system of the present embodiment 1, it is configured in such a manner that it instructs the monitoring camera 1 to start video recording and to terminate the recording in response to the detection of the start and end of the maintenance of the monitoring recorder 2, and causes the monitoring camera 1 to execute the processing corresponding to the instruction. Accordingly, if a state occurs in which the video data cannot be stored temporarily because of the maintenance or the like of the monitoring recorder 2, the monitoring camera 1 can store the video data instead of the monitoring recorder 2, thereby being able to store the monitoring video data without loss as the whole monitoring system. In addition, unlike a duplex system that stores the same video data in a plurality of recorders using plural monitoring recorders, the present embodiment 1 does not store the same video data in a plurality of storage media. Accordingly, it is advantageous in the utilization efficiency of the storage medium.

In addition, the present embodiment 1 is configured in such a manner that it instructs the monitoring camera 1 to start and stop the video recording in response to the detection of the anomaly and recovery of the video recording of the monitoring recorder 2, and causes the monitoring camera 1 to execute the processing of the instruction. Accordingly, even if a state occurs in which the monitoring recorder 2 cannot continue to store the video data owing to the anomaly of the device or the anomaly of the software, the monitoring camera 1 stores the video data instead of the monitoring recorder 2, thereby being able to store the monitoring video data as the whole monitoring system without losing the video data. If the device anomaly or software anomaly does not recover immediately, although it is conceivable that the monitoring camera 1 cannot continue storing the video data for a long time depending on the capacity of the storage medium of the monitoring camera 1, it is an advantage of the monitoring system that the video data immediately after the occurrence of the anomaly is stored to some extent even in such a case that the monitoring recorder is broken intentionally by someone.

Embodiment 2

In the embodiment 1, although an example is described in which the monitoring recorder 2 detects the occurrence and recovery of the anomaly of itself, and uses them as a motive for a start and stop of the video data recording by the monitoring camera 1. The embodiment 2, however, shows a system in which the monitoring camera 1 detects anomaly of the monitoring recorder 2 or anomaly of the communication network 4, and uses it as a motive for a start and stop of the video data recording.

Incidentally, as for the configuration of the monitoring system, since it is the same as that shown in FIG. 1 to FIG. 3 in the embodiment 1, its drawings and duplicate description will be omitted. The present embodiment 2 differs from the embodiment 1 in the operation of the monitoring camera 1.

The control signal transmitter-receiver 104 of the monitoring camera 1 in the embodiment 2 not only receives the control signal to the monitoring camera 1, but also transmits a survival confirmation command to the monitoring recorder 2 via the network.

Figure 5:
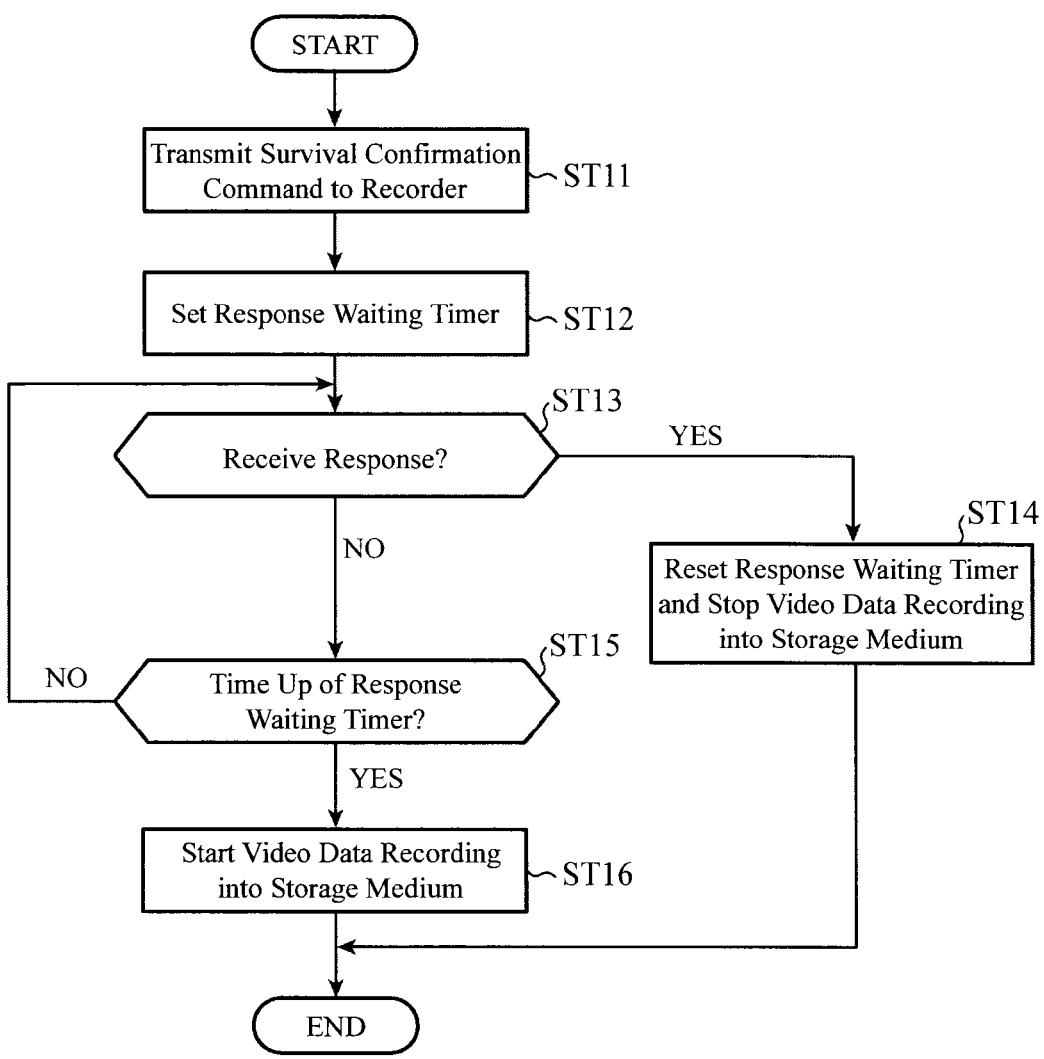
FIG. 5 is a flowchart showing the processing of the monitoring camera of an embodiment 2 in accordance with the present invention.

FIG. 5 is a flowchart showing the processing of the monitoring camera 1 of the embodiment 2 in accordance with the present invention.

The controller 107 of the monitoring camera 1 controls the control signal transmitter-receiver 104 in such a manner that it transmits a survival confirmation command to the monitoring recorder 2 via the communication network 4 (step ST11).

Next, the controller 107 sets a response waiting timer (step ST12).

The controller 107 decides whether the control signal transmitter-receiver 104 receives from the monitoring recorder 2 a response to the survival confirmation command transmitted at step ST11 (step ST13).

If it decides at step ST13 that the response to the survival confirmation command is received ("YES" at step ST13), the controller 107 resets the response waiting timer, and if the video recording section 106 is recording the video data into the storage medium 105, it causes the video recording section 106 to terminate the recording (step ST14).

On the other hand, if it decides at step ST13 that the response to the survival confirmation command cannot be received ("NO" at step ST13), the controller 107 decides whether the response waiting timer is up or not (step ST15).

If the response waiting timer is not yet up at step ST15 ("NO" at step ST15), the controller 107 returns its processing to step ST13.

If the response waiting timer is up at step ST15 ("YES" at step ST15), the controller 107 decides that the monitoring recorder 2 or communication network 4 is not in the normal state, that is, that the monitoring recorder 2 is not in the state of being able to store the video data, and the video recording section 106 starts to record the video data into the storage medium 105 (step ST16). More specifically, the controller 107 instructs the encoder 102 to send the encoded video data to the video recording section 106, and controls the video recording section 106 so as to record the video data into the storage medium 105.

Incidentally, as a survival confirmation method of the monitoring recorder 2 or communication network 4, when the communication network 4 is an IP network, its installation will become easier by using a method such as ping that is widely known as software for testing the reachability between nodes, which transmits an "echo request" packet as the survival confirmation command in conformity with the specifications of the ICMP (Internet Control Message Protocol), and receives an "echo reply" packet as the response command. As another method, a method is conceivable of defining a testing command and a response command originally by using UDP (User Datagram Protocol), followed by installing.

As described above, according to the monitoring system of the present embodiment 2, it detects the anomaly of the monitoring recorder 2 or communication network 4 by sending the survival confirmation command from the monitoring camera 1 to the monitoring recorder 2, and with this as motivation, controls in such a manner that the monitoring camera 1 starts and stops the video recording voluntarily. Accordingly, it can record the monitoring video data without losing it as the whole monitoring system.

Incidentally, in the present embodiment 2, the component that transmits the survival confirmation command to the monitoring recorder 2 via the network can be the external PC 3. The external PC 3 can be combined with the monitoring recorder 2 into a unit. The external PC 3 is sometimes referred to as a monitoring apparatus or a monitor.

Referring to FIG. 5, processing will be described in which the external PC 3 transmits the survival confirmation command.

The external PC 3 transmits the survival confirmation command to the monitoring recorder 2 via the communication network 4 (step ST11).

Next, the external PC 3 sets the response waiting timer (step ST12).

The external PC 3 decides whether it receives from the monitoring recorder 2 a response to the survival confirmation command transmitted at step ST11 or not (step ST13).

If it decides at step ST13 that the response to the survival confirmation command is received ("YES" at step ST13), the external PC 3 decides that the monitoring recorder 2 is in the normal state in which it can record the video data, resets the response waiting timer, and transmits, if the monitoring camera 1 is recording the video data into the storage medium 105, the video recording stop instruction to the monitoring camera 1 (step ST14). The video recording section 106 of the monitoring camera 1 that receives the video recording stop instruction terminates the video data recording into the storage medium 105.

On the other hand, if it decides at step ST13 that the response to the survival confirmation command cannot be received ("NO" at step ST13), the external PC 3 decides whether the response waiting timer is up or not (step ST15).

Unless the response waiting timer is up at step ST15 ("NO" at step ST15), the external PC 3 returns to the processing at step ST13.

If the response waiting timer is up at step ST15 ("YES" at step ST15), the external PC 3 decides that the monitoring recorder 2 is not in the normal state, that is, that the monitoring recorder 2 is not in the state of being able to store the video data, and transmits the video recording start instruction to the monitoring camera 1. Receiving the video recording start instruction, the video recording section 106 of the received monitoring camera 1 starts to record the video data into the storage medium 105 (step ST16). More specifically, the controller 107 instructs the encoder 102 to send the encoded video data to the video recording section 106, and controls the video recording section 106 so as to record the video data into the storage medium 105. Incidentally, while the video recording section 106 is recording the video data into the storage medium 105, the distribution of the encoded video data to the network by the video transmitter 103 may be or may not be interrupted.

Incidentally, in response to an inquiry or request of the monitoring camera 1, the external PC 3 may check the state of the monitoring recorder 2. In other words, in response to the inquiry or request from the monitoring camera 1, the external PC 3 may transmit the survival confirmation command to the monitoring recorder 2.

Embodiment 3

In the embodiment 2, an embodiment is described in which the monitoring camera 1 sends the survival confirmation command to the monitoring recorder 2 to detect the anomaly, and taking this as motivation, starts and stops the video data recording. The embodiment 3, however, shows a system which causes the monitoring recorder 2 to send its state regularly by means of a survival heartbeat, and which taking this as motivation, starts and stops the recording. The term "heartbeat" refers to a signal for network equipment to inform that it is "alive", "operating normally", or "recordable" to its party for a prescribed time period (for a predetermined time period) or at every fixed transmission interval (at every predetermined period). The monitoring camera 1 receives the heartbeat of the monitoring recorder 2 via the network, and checks the state of the monitoring recorder 2.

Incidentally, as for a configuration of the monitoring system, since it is the same as that shown in FIGS. 1-3 in the embodiment 1 and embodiment 2, its drawings and duplicate description will be omitted. The monitoring camera 1 and monitoring recorder 2 of the embodiment 3 differ from those of the embodiment 2 in their operation.

Figure 6:
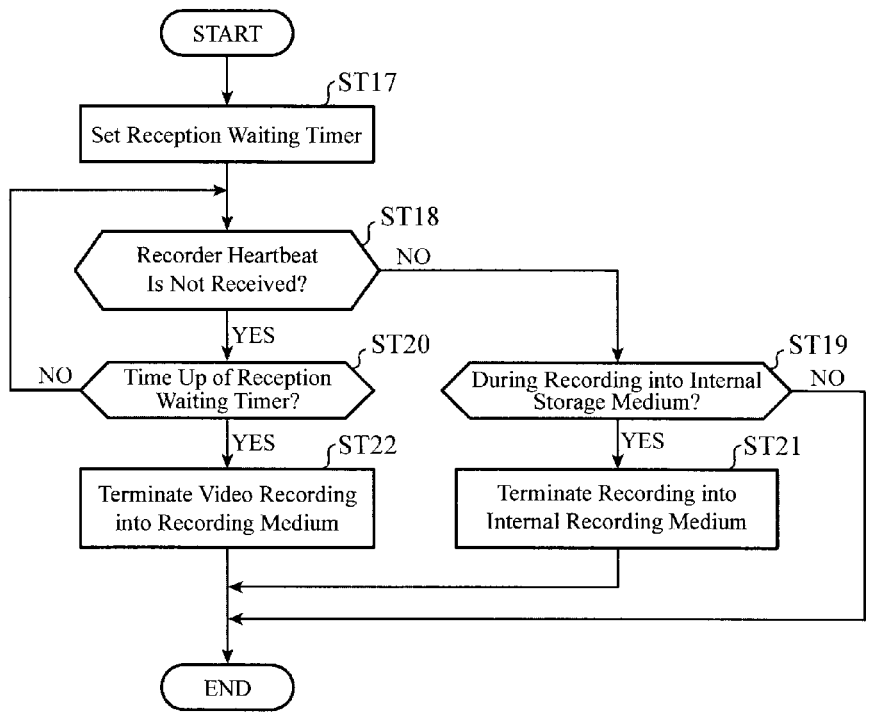
FIG. 6 is a flowchart showing the processing of the monitoring camera of an embodiment 3 in accordance with the present invention.

FIG. 6 is a flowchart showing the processing of the monitoring camera 1 of the embodiment 3 in accordance with the present invention.

The monitoring recorder 2 continues to transmit the heartbeat to the monitoring camera 1 from the control signal transmitter-receiver 206 at every fixed period.

The controller 107 of the monitoring camera 1 sets its reception waiting timer (step ST17). The reception waiting timer can set a time period longer than a fixed time period in which the heartbeat is to be transmitted.

The controller 107 decides whether the control signal transmitter-receiver 104 receives the heartbeat from the monitoring recorder 2 (step ST18).

When it decides at step ST18 that it can receive the heartbeat from the monitoring recorder 2 ("NO" at step ST18), the controller 107 resets the reception waiting timer, checks whether the video recording section 106 is recording the video data into the storage medium 105 (step ST19), and terminates the recording if it is writing the data ("YES" at step ST19) (step ST20). Unless it is recording ("NO" at step ST19), it terminates the processing.

On the other hand, if it cannot receive the heartbeat from the monitoring recorder 2 at step ST18 ("YES" at step ST18), the controller 107 decides whether the reception waiting timer is up or not.

Unless the reception waiting timer is up at step ST20 ("NO" at step ST20), the controller 107 returns its processing to step ST18.

If the reception waiting timer is up at step ST20 ("YES" at step ST20), the controller 107 decides that the monitoring recorder 2 is not in the normal state, and the video recording section 106 starts recording the video data into the storage medium 105 (step ST22). More specifically, the controller 107 instructs the encoder 102 to transmit the encoded video data to the video recording section 106, and controls in such a manner that the video recording section 106 writes it into the storage medium 105.

As for the method using the heartbeat on a communication network, since it is enough for the method to use unilateral communication from the monitoring recorder 2 to the monitoring camera 1, using the UDP (User Data Protocol) enables the method to be installed while limiting the communication load to a minimum.

Incidentally, in the embodiment 3, the component that checks the state of the monitoring recorder 2 can be the external PC 3. The external PC 3 receives the heartbeat of the monitoring recorder 2 via the network, and checks the state of the monitoring recorder 2.

Referring to FIG. 6, processing will be described in which the external PC 3 checks the state of the monitoring recorder 2.

The monitoring recorder 2 continues to transmit the heartbeat to the external PC 3 from the control signal transmitter-receiver 206 at every fixed period.

The external PC 3 sets its reception waiting timer (step ST17). The reception waiting timer can set a time period longer than the fixed time period in which the heartbeat is to be transmitted.

The external PC 3 decides whether it can receive the heartbeat from the monitoring recorder 2 (step ST18).

When it decides at step ST18 that it can receive the heartbeat from the monitoring recorder 2 ("NO" at step ST18), the external PC 3 resets the reception waiting timer, checks whether the monitoring camera 1 is recording the video data (step ST19), and transmits a video recording stop instruction to the monitoring camera 1 (step ST20). Unless it is recording ("NO" at step ST19), it terminates the processing. When the external PC transmits the video recording stop instruction at step ST20, the video recording section 106 of the monitoring camera 1, which receives the video recording stop instruction, terminates the video data recording into the storage medium 105 (step ST21).

On the other hand, unless it cannot receive the heartbeat from the monitoring recorder 2 at step ST18 ("YES" at step ST18), the external PC 3 decides whether the reception waiting timer is up or not.

Unless the reception waiting timer is up at step ST20 ("NO" at step ST20), the external PC 3 returns its processing to step ST18.

If the reception waiting timer is up at step ST20 ("YES" at step ST20), the external PC 3 decides that the monitoring recorder 2 is not in the normal state, and transmits a video recording start instruction to the monitoring camera 1. Receiving the video recording start instruction, the video recording section 106 of the monitoring camera 1 starts recording the video data into the storage medium 105. More specifically, the controller 107 instructs the encoder 102 to transmit the encoded video data to the video recording section 106, and controls in such a manner that the video recording section 106 writes it into the storage medium 105. Incidentally, while the video recording section 106 is writing the video data into the storage medium 105, the distribution of the encoded video data to the network by the video transmitter 103 may be or may not be interrupted.

Incidentally, in response to an inquiry or request of the monitoring camera 1, the external PC 3 may check the state of the monitoring recorder 2. Thus, in response to the inquiry or request from the monitoring camera 1, the external PC 3 may receive the heartbeat of the monitoring recorder 2.

Embodiment 4

In the embodiments 1 to 3, although a system is described which switches the recording into the internal storage medium 105 in the monitoring camera 1 in response to the notification/detection of the unrecordable state in the monitoring recorder 2, the embodiment 4 proposes a method of writing into a place other than the monitoring camera 1 or the monitoring recorder 2 if it cannot write into the monitoring recorder 2 and the internal storage medium 105 as well.

Incidentally, as for the detection method of the unrecordable state in the monitoring recorder 2, since it is the same as in the embodiments 1 to 3, the description thereof will be omitted.

Figure 7:
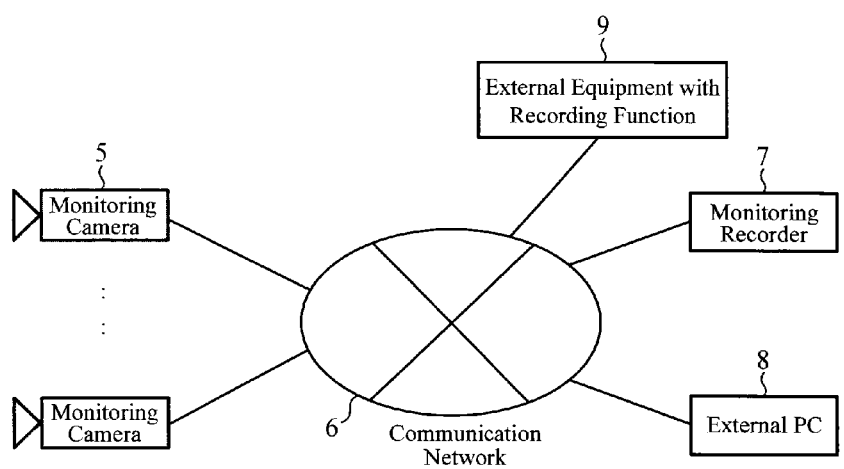
FIG. 7 is a diagram showing an overall configuration of a monitoring system of an embodiment 4 in accordance with the present invention.

FIG. 7 is a diagram showing an overall configuration of a monitoring system of the embodiment 4 in accordance with the present invention.

As in FIG. 1, the monitoring system has a monitoring camera 5 that takes an image and encodes it into monitoring video data. A plurality of such monitoring cameras 5, a monitoring recorder 7, an external PC 8 and external equipment 9 are connected via a network (communication network 6).

Although the external equipment 9 is connected to the same network, it is equipment for the purpose other than monitoring, and is unknown recording equipment.

Figure 8:
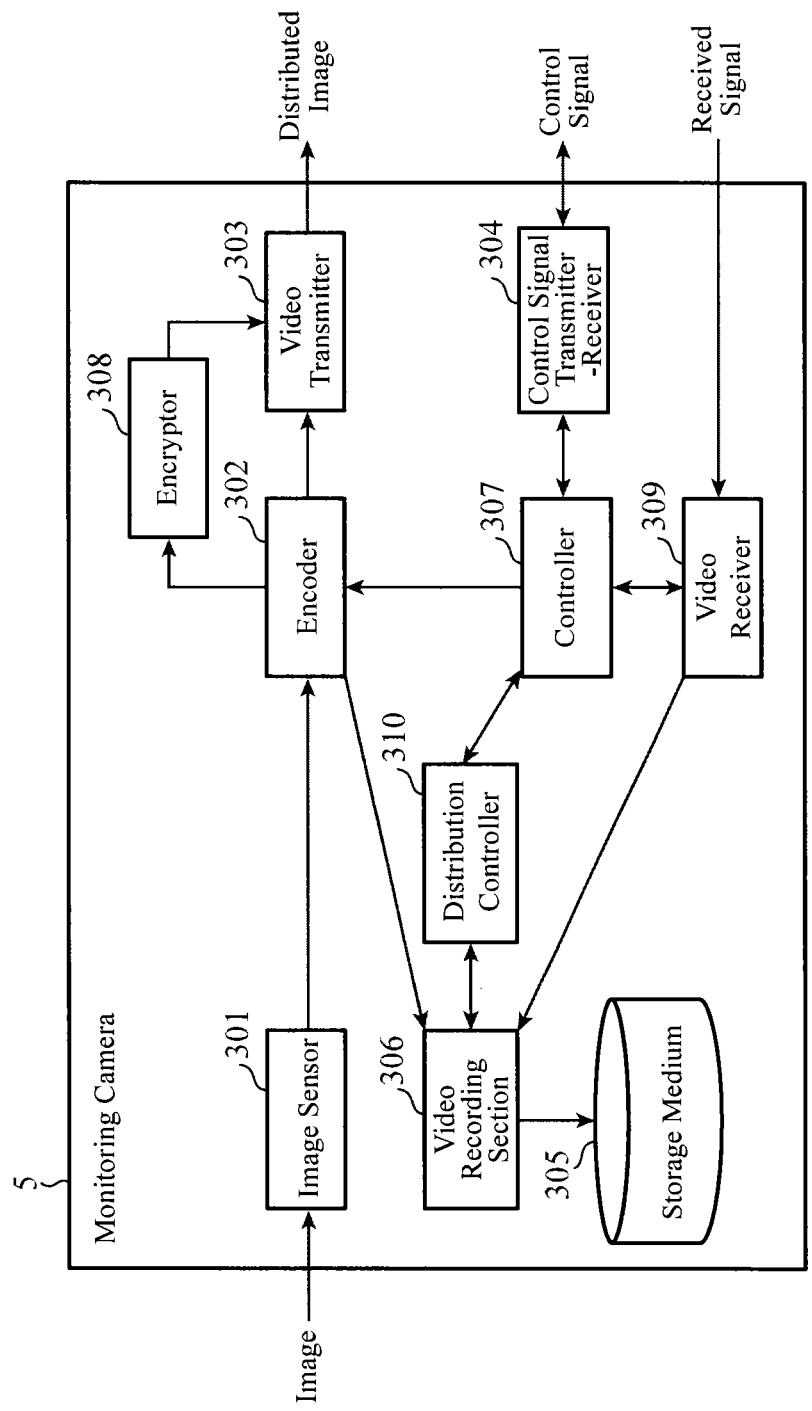
FIG. 8 is a block diagram of a monitoring camera connected to the monitoring system of the embodiment 4 in accordance with the present invention.

FIG. 8 is a block diagram of the monitoring camera 5 connected to the monitoring system of the embodiment 4 in accordance with the present invention.

The monitoring camera 5 comprises an image sensor 301, an encoder 302, a video transmitter 303, a control signal transmitter-receiver 304, a storage medium 305, a video recording section 306, a controller 307, an encryptor 308, a video receiver 309 and a distribution controller 310.

The difference from the monitoring camera 1 of FIG. 1 will be described.

The encryptor 308 has a function of encrypting the video encoded by the encoder 302.

The controller 307 checks whether the storage medium 305 is in a recordable state or unrecordable state of the video data.

The distribution controller 310 manages the record distribution information. The record distribution information includes a "current record recipient", "record recipient switching time", "information about known record recipient on the same network", and a "state of the storage medium 305".

If the monitoring recorder 7 and the storage medium 305 in the monitoring camera 5 get into an unrecordable state, the control signal transmitter-receiver 304 searches for equipment capable of recording the distributed video on the same network.

The video transmitter 303 distributes the video data to the recordable and distributable equipment located by the control signal transmitter-receiver 304.

Figure 9:
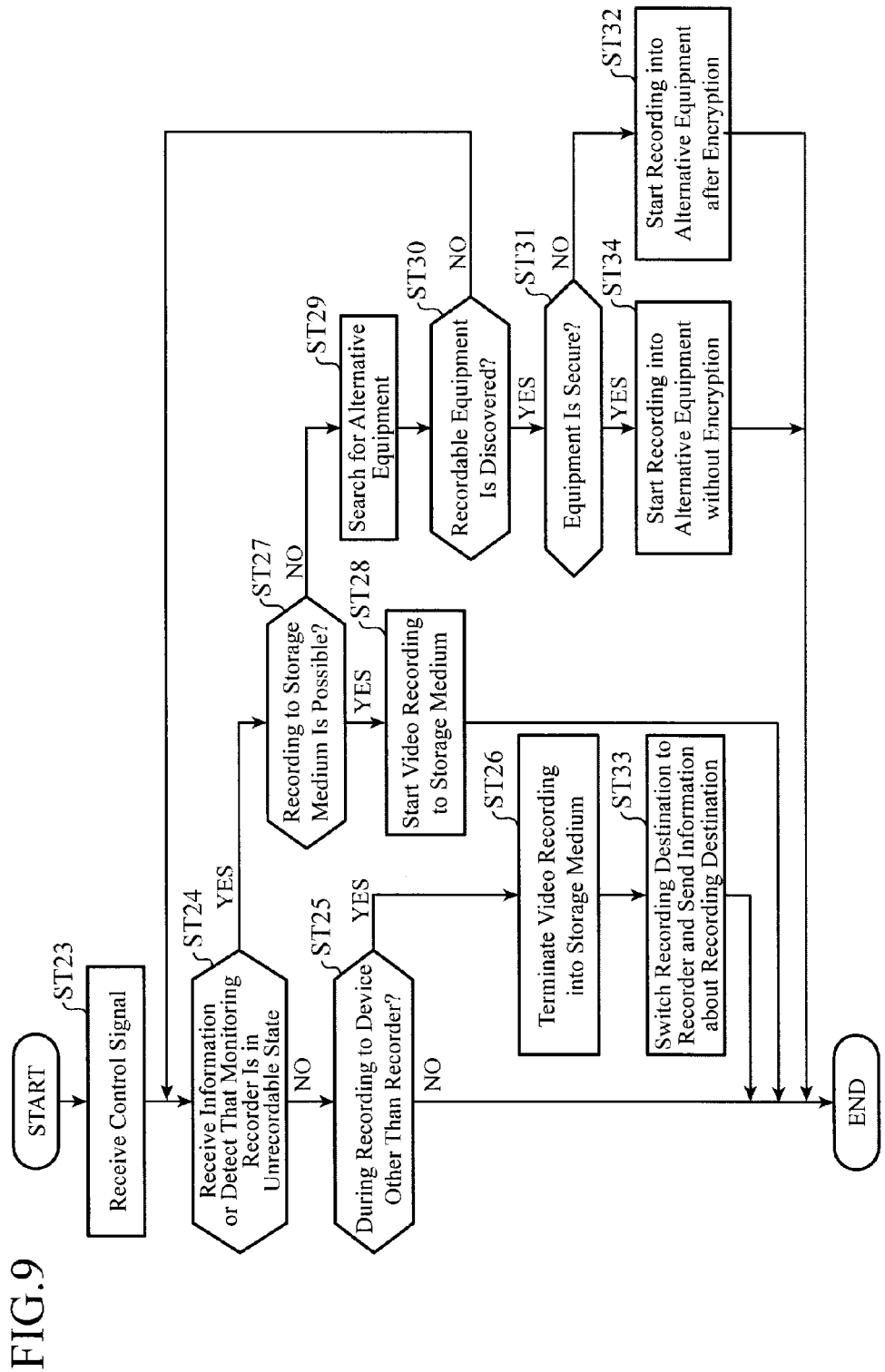
FIG. 9 is a flowchart showing the processing of the monitoring camera of the embodiment 4 in accordance with the present invention.

FIG. 9 is a flowchart showing the processing of the monitoring camera 5 of the embodiment 4 in accordance with the present invention.

The control signal transmitter-receiver 304 of the monitoring camera 1 receives the control signal from the outside via the communication network 4 (step ST23).

The controller 307 decides whether the control signal transmitter-receiver 304 detects an unrecordable state of the monitoring recorder 7 or not (step ST24). Alternatively, it decides whether the control signal transmitter-receiver 304 receives the video recording start instruction or not.

If the controller 307 decides at step ST24 that the monitoring recorder 7 is in an unrecordable state, or that it receives the video recording start instruction ("YES" at step ST24), the controller 307 checks whether the internal storage medium 305 of the monitoring camera 5 is recordable or not via the distribution controller 310 (step ST27).

If the controller 307 decides at step ST27 that the internal storage medium 305 is recordable ("YES" at step ST27), it starts video data recording into the internal storage medium 305 (step ST28).

If the controller 307 decides at step ST27 that the internal storage medium 305 is unrecordable ("NO" at step ST27), the control signal transmitter-receiver 304 starts to search for recordable and distributable equipment on the same network (step ST29).

If it detects the recordable and distributable equipment on the same network ("YES" at step ST30), the controller 307 refers to the distribution controller 310 to check whether it is known recordable and distributable equipment or not (step ST31). Thus, it checks whether the recordable and distributable equipment located at step ST30 is secure equipment or not.

Unless the controller 307 decides at step ST31 that it is known recordable and distributable equipment ("NO" at step ST31), the controller 307 causes the encryptor 308 to encrypt, and switches the recording destination to the recordable and distributable equipment located at step ST30 (step ST32). More specifically, the controller 307 instructs the encoder 302 to supply the encoded video data to the encryptor 308 so that the encryptor 308 encrypts and the video transmitter 303 transmits the encrypted video data to the recordable and distributable equipment located at step ST30, thereby controlling so that the recordable and distributable equipment records the encrypted video data.

If the recordable and distributable equipment is known ("YES" at step ST31), the controller 307 switches the record recipient directly to it without encrypting the video data (step ST34). More specifically, the controller 307 instructs the encoder 302 to supply the encoded video data to the video transmitter 303 so that the video transmitter 303 transmits the encoded video data to the recordable and distributable equipment located at step ST30, thereby controlling so that the recordable and distributable equipment records the encoded video data. Thus, it switches the record recipient directly without encrypting. Incidentally, when the controller 307 switches the record destination to the recordable and distributable equipment at step ST32 or step ST34, the controller 307 stores in the distribution controller 310 the IP address of the record recipient and the time of switching to the record destination.

If it cannot locate the recordable and distributable equipment at step ST30 ("NO" at step ST30), the controller 307 returns to step ST24 to check information from the monitoring recorder 7 again.

If the controller 307 does not receive any information from the monitoring recorder 7 at step ST24 ("NO" at step ST24), and if the internal storage medium 305 or the external equipment is carrying out recording ("YES" at step ST25), the controller 307 terminates the recording (step ST26).

At step ST33, the controller 307 switches the recipient, to which the video transmitter 303 distributes the video data, to the monitoring recorder 7, and causes the control signal transmitter-receiver 304 to send to the monitoring recorder 7 the record destination information the distribution controller 310 manages (step ST33). The monitoring recorder 7 restores the video it was unable to record in accordance with the switching destination IP and the switching time it acquires from the monitoring camera 5.

Incidentally, in the present embodiment 4, the component that receives the control signal from the outside via the communication network 4 can be the external PC 8. In other words, the external PC 8 can receive the control signal from the outside via the communication network 4, decides the unrecordable state of the monitoring recorder 7, and transmits a recording start instruction to the monitoring camera 5 if it detects the unrecordable state. The external PC 8 is sometimes called a monitoring apparatus or a monitor.

The monitoring camera 5 that receives the recording start instruction executes the processing from step ST24 onward.

Incidentally, in response to an inquiry or request from the monitoring camera 5, the external PC 8 may receive the control signal from the outside via the communication network 4.

As described above, even if the monitoring recorder 7 has a failure and the internal storage medium 305 of the monitoring camera 5 is unrecordable, the present embodiment 4 can cope with the situation of being unable to perform record distribution by switching to the recorder on the same network, thereby being able to operate without losing the record as the whole monitoring system. Besides, even if the recordable and distributable device located on the network is unknown one, it can ensure the security by encryption.

In addition, when the monitoring camera 5 switches the record destination of the video data to the recordable and distributable equipment on the same network, the monitoring camera 5 manages the IP address of the switching destination and the switching time internally, which enables the monitoring recorder 7 to restore after its recovery the video data it has not been able to store by using the information, thereby being able to prevent the loss of the record and to prevent the record destination from being separated.

As the method the monitoring camera 5 uses for detecting the external recordable and distributable equipment, the monitoring system can search for it using the principle of a DNS (Domain NAME SYSTEM) that is generally used in the network field. After locating the equipment, it can set the external recordable equipment in a distributable state by a method such as DHCP (Dynamic Host Configuration Protocol), UPnP (Universal Plug and Play) and Bonjour.

Embodiment 5

In the embodiment 4, the method is described which searches for the recordable and distributable equipment and switches to the record recipient when the monitoring recorder 7 is in the unrecordable state and the internal storage medium 305 is unable to perform recording. In the embodiment 5, a system will be described in which in response to a recording request from another camera, the monitoring camera 5 records the requested video data into its internal storage medium 305 without stopping its own video distribution.

Incidentally, as for the configurations of the monitoring system and the monitoring camera 5, since they are the same as those shown in FIG. 7 and FIG. 8 in the embodiment 4, their drawings and duplicate description will be omitted.

The controller 307 has a function of sending information about the recordable and distributable equipment the control signal transmitter-receiver 304 has located to the encoder 302, and a function of sending information about the switched record recipient to the distribution controller 310.

The video recording section 306 notifies the distribution controller 310 whether the storage medium 305 is recordable or not.

Figure 10:
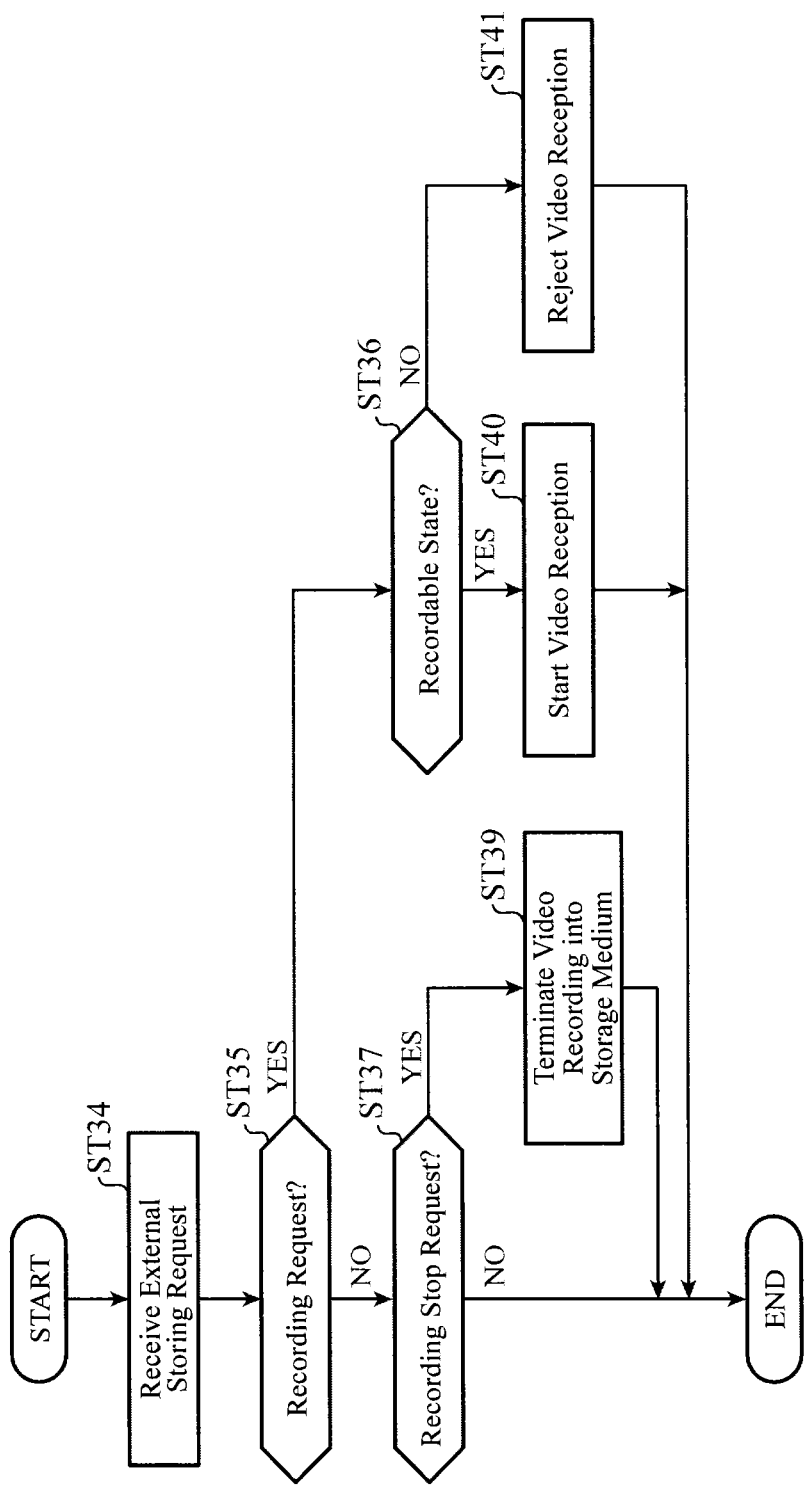
FIG. 10 is a flowchart showing the processing of the monitoring camera of an embodiment 5 in accordance with the present invention.

FIG. 10 is a flowchart showing the monitoring camera 5 of the embodiment 5 in accordance with the present invention.

The control signal transmitter-receiver 304 of the monitoring camera 5 receives a storing request of the video data from the outside (step ST34).

The controller 307 analyzes the request it receives from the control signal transmitter-receiver 304, and decides whether it is a recording request or not (step ST35).

If the controller 307 decides that it is the recording request at step ST35 ("YES" at step ST35), the controller 307 requests the distribution controller 310 to confirm whether the internal storage medium 305 is in the recordable state or not (step ST36).

If it is in the recordable state ("YES" at step ST36), the control signal transmitter-receiver 304 sends a recordable response, and the video receiver 309 starts to receive the video (step ST40).

If the controller 307 decides at step ST36 that it is unrecordable ("NO" at step ST36), the control signal transmitter-receiver 304 sends an unrecordable response, and rejects receiving the video (step ST41).

If the controller 307 decides at step ST35 that the request is not a recording request ("NO" at step ST35), but a recording stop request ("YES" at step ST37), the video recording section 306 terminates the video recording into the storage medium 305 (step ST39).

Incidentally, in the present embodiment 5, the component that receives the storing request of the video data from the outside may be the external PC 8. Thus, the external PC 8 may receive the storing request of the video data from the outside, and transmit the recording start instruction to the monitoring camera 5 if it decides that the request is a recording request. The external PC 8 is sometimes called a monitoring apparatus or a monitor.

The monitoring camera 5 that receives the recording start instruction executes the processing from step ST35 onward.

Incidentally, the external PC 8 may receive the storing request of the video data from the outside by an inquiry or request of the monitoring camera 5.

As described above, according to the present embodiment 5, the monitoring camera 5 itself becomes a recording medium of the external video, thereby being able to prevent another camera on the same network from getting into an unrecordable state. In addition, since an ordinary network can carry out interactive communication, the monitoring camera 5 can record the video of another camera without terminating its own video distribution using the same wiring. Thus, it is not necessary to provide a device that is used only in an anomaly such as a system having an HDD added to the monitoring recorder 7, which is advantageous from an aspect of installation.

Embodiment 6

The embodiment 6 shows a method of setting a recordable device on the same network to the distribution controller 310 of the monitoring camera 5.

Incidentally, as for the configurations of the monitoring system and the monitoring camera 5, since they are the same as those shown in FIG. 7 and FIG. 8 in the embodiments 4 and 5, their drawings and duplicate description will be omitted. Only, the monitoring camera 5 comprises an input-output unit that enables a user to input information or that can output information to the user. As for the input-output unit, it can be a GUI.

The recordable and distributable equipment on the same network is set to the monitoring camera 5 from the external PC 8 via the communication network 6.

Figure 11:
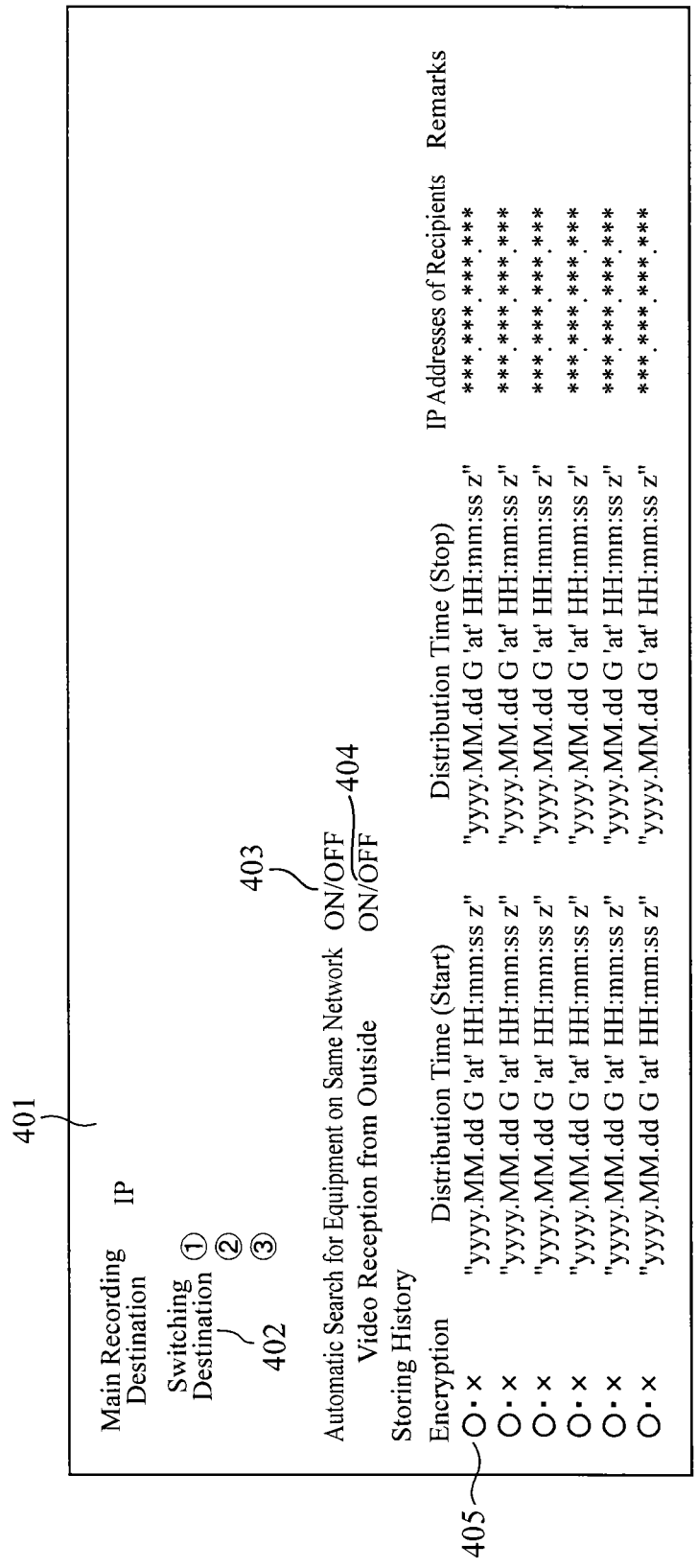
FIG. 11 is an overall image of a GUI that sets a recordable device of the monitoring camera of an embodiment 6 in accordance with the present invention.

FIG. 11 is an overall picture of a GUI that sets a recordable device of the monitoring camera 5 in the present embodiment 6.

A main recorder IP address input unit 401 records the IP address of the monitoring recorder 7 that records video.

A switched recording destination IP address input unit 402 records an IP address of recordable and distributable equipment on the same network, or records another monitoring camera. As for the recordable device registered here, its information can be transmitted as known recordable and distributable equipment without encrypting in the embodiment 4.

A same network external recorder automatic search selector 403 sets whether to search for equipment on the same network when getting into an unrecordable state.

A video reception selector 404 from the outside selects to receive when it is in a recordable state of the video from another camera that becomes unrecordable.

A record distribution history 405 is a display of a list of record recipients. In the embodiment 4, it is for manually restoring images when the monitoring recorder cannot restore the images.

In addition, a configuration is also possible which enables setting whether to store into the storage medium 305 in the monitoring camera 5 or not. In addition, a configuration is also possible which enables setting the order of priority among the storage medium 305 in the monitoring camera 5 and the recordable equipment on the same network.

As described above, according to the embodiment 6, it can set the recordable device by receiving the input from a user, thereby being able to carry out a more efficient monitoring system operation.

Incidentally, it is to be understood that a free combination of the individual embodiments, variations of any components of the individual embodiments or removal of any components of the individual embodiments is possible within the scope of the present invention.

In addition, as for the components used for the control of the monitoring cameras 1 and 5 and monitoring recorders 2 and 7 in the individual embodiments 1 to 6, they are implemented by program processing using a CPU based on software.

INDUSTRIAL APPLICABILITY

A monitoring system and a monitoring camera in accordance with the present invention can secure the completeness of the monitoring video recording while maintaining high utilization efficiency of the recording capacity. Accordingly, it is suitable for an application to a monitoring system and a monitoring camera, which converts an image taken with the camera to video data and distributes it via the network, and carries out recording of the monitoring video for the purpose of remote monitoring and the like.

DESCRIPTION OF REFERENCE SYMBOLS 1, 5 monitoring camera; 2, 7 monitoring recorder; 3, 8 external PC; 4, 6 communication network; 101, 301 image sensor; 102, 302 encoder; 103, 204, 303 video transmitter; 104, 206, 304 control signal transmitter-receiver; 105, 202, 305 storage medium; 106, 203, 306 video recording section; 107, 307 controller; 201, 309 video receiver; 205 device state monitor; 310 distribution controller.

What is claimed is:

1. A monitoring system comprising:
   a monitoring camera configured to transmit, via a network, monitoring video data the monitoring camera takes, the monitoring camera including a storage medium;
   a monitoring recorder configured to receive and record the monitoring video data transmitted from the monitoring camera via the network; and
   deciding circuitry configured to determine whether the monitoring recorder is unable to record the monitoring video data,
   wherein the monitoring camera records the monitoring video data in the storage medium under a prescribed condition, the prescribed condition including a case in which the deciding circuitry determines that the monitoring recorder is unable to record the monitoring video data.

2. The monitoring system according to claim 1, wherein the deciding circuitry is further configured to determine that the monitoring recorder is unable to record the monitoring video data in response to not receiving a cyclical signal transmitted at a predetermined time from the monitoring recorder.

3. The monitoring system according to claim 2, wherein the deciding circuitry checks whether the storage medium is in an unrecordable state of the video data, and wherein the monitoring system further comprises:
   a control signal transmitter-receiver that searches for other equipment configured to record and distribute the video data on the network if the storage medium is in the unrecordable state; and
   a video transmitter that transmits the monitoring video data to the other equipment if the control signal transmitter-receiver locates the recordable and distributable equipment.

4. The monitoring system according to claim 3, further comprising:
   a distribution controller that stores information about a list of known record recipients and a record recipient switching time; and
   an encryptor that encrypts the monitoring video data unless the other equipment the control signal transmitter-receiver locates is not included in the list of known record recipients, wherein
   the deciding circuitry stores in the distribution controller the record recipient switching time to the other equipment and an IP address of the record recipient.

5. The monitoring system according to claim 4, wherein the control signal transmitter-receiver transmits the record recipient switching time and the IP address of the record recipient to the monitoring recorder when the monitoring recorder returns to a recordable state.

6. The monitoring system according to claim 4, wherein the monitoring camera is further configured to receive and record the list of known record recipients.

7. The monitoring system according to claim 1, wherein the deciding circuitry is further configured to transmit a confirmation signal to the monitoring recorder, and determine that the monitoring recorder is unable to record the monitoring video data in response to not receiving a response signal to the confirmation signal from the monitoring recorder.

8. The monitoring system according to claim 7, wherein the deciding circuitry checks whether the storage medium is in an unrecordable state of the video data, and wherein the monitoring system further comprises:
   a control signal transmitter-receiver that searches for other equipment configured to record and distribute the video data on the network if the storage medium is in the unrecordable state; and
   a video transmitter that transmits the monitoring video data to the other equipment if the control signal transmitter-receiver locates the recordable and distributable equipment.

9. The monitoring system according to claim 8, further comprising:
   a distribution controller that stores information about a list of known record recipients and record recipient switching time; and
   an encryptor that encrypts the monitoring video data unless the other equipment the control signal transmitter-receiver locates is not included in the list of known record recipients, wherein
   the deciding circuitry stores in the distribution controller the record recipient switching time to the other equipment and an IP address of the record recipient.

10. The monitoring system according to claim 9, wherein the control signal transmitter-receiver transmits the record recipient switching time and the IP address of the record recipient to the monitoring recorder when the monitoring recorder returns to a recordable state.

11. The monitoring system according to claim 9, wherein the monitoring camera is further configured to receive and record the list of known record recipients.

12. The monitoring system according to claim 1, wherein the monitoring camera, when receiving a control signal that requests to start video recording from another monitoring camera via the network, records monitoring video data, which is taken with the another monitoring camera and is received via the network, in the storage medium.

13. A monitoring system comprising:
    a monitoring camera configured to transmit, via a network, monitoring video data the monitoring camera takes, the monitoring camera including a storage medium; and
    a monitoring recorder that receives and records the monitoring video data the monitoring camera transmits via the network, wherein
    the monitoring recorder transmits, when it decides that its own video recording is impossible, a control signal instructing to start video recording to the monitoring camera, and transmits, when it decides that its own video recording becomes possible, a control signal instructing to terminate the video recording to the monitoring camera; and
    the monitoring camera records, when receiving the control signal instructing to start video recording, the monitoring video data in the storage medium, and terminates, when receiving the control signal instructing to terminate the video recording, the recording of the monitoring video data in the storage medium.

14. The monitoring system according to claim 13, wherein
    the monitoring recorder detects a start and stop of its own device restart, decides that its own video recording is impossible when it detects the start of its own device restart, and decides that its own video recording becomes possible when it detects the end of its own device restart.

15. The monitoring system according to claim 13, wherein the monitoring recorder, detects an occurrence or recovery of an anomaly of the storage medium it possesses or an occurrence or recovery of an anomaly of its software component, decides that its own video recording is impossible when it detects the anomaly, and decides that its own video recording becomes possible when it detects the recovery of the anomaly.

16. A monitoring camera comprising:

a video transmitter that transmits, via a network, monitoring video data the monitoring camera takes; and a storage medium, wherein the monitoring camera records the monitoring image data into the storage medium under a prescribed condition, the prescribed condition including a case in which an external device receiving the monitoring video is unable to record the monitoring video.

* * * * *